(12) United States Patent
Jansson (10) Patent No.: US 8,641,330 B2
(45) Date of Patent: Feb. 4, 2014

(54) TOOL (75) Inventor: Mikael Jansson, Avesta (SE)

(73) Assignee: Seco Tools AB, Fagersta (SE)

( * ) Notice: Subject to any disclaimer, the term of this patent is extended or adjusted under 35 U.S.C. 154(b) by 911 days.

(21) Appl. No.: 12/095,757

(22) PCT Filed: Dec. 5, 2006

(86) PCT No.: PCT/SE2006/050540
§ 371 (c)(1),
(2), (4) Date: Sep. 10, 2008

(87) PCT Pub. No.: WO2007/067138
PCT Pub. Date: Jun. 14, 2007

(65) Prior Publication Data
US 2009/0238650 A1 Sep. 24, 2009

(30) Foreign Application Priority Data
Dec. 5, 2005 (SE) ...................................... 0502678

(51) Int. Cl.
B23P 15/28 (2006.01)
(52) U.S. Cl.
USPC .............. 407/102; 407/97; 407/104; 407/105
(58) Field of Classification Search
USPC ............ 407/102, 104, 105, 97, 47, 94, 41, 49
See application file for complete search history.

(56) References Cited

U.S. PATENT DOCUMENTS

| 1,413,665 | A | | 4/1922 | Lane et al. |
| 3,623,201 | A | * | 11/1971 | Gustafson .................... 407/104 |
| 3,662,444 | A | | 5/1972 | Erkfritz |
| 3,673,657 | A | | 7/1972 | Gusttafson et al. |
| 4,009,742 | A | | 3/1977 | Ziegelmeyer |
| 4,364,693 | A | * | 12/1982 | Lindsay ........................ 407/104 |
| 4,869,624 | A | * | 9/1989 | Viellet ........................... 407/104 |
| 6,254,316 | B1 | * | 7/2001 | Strand ........................... 407/113 |

(Continued)

FOREIGN PATENT DOCUMENTS

| EP | 0997217 A2 | 5/2000 |
| FR | 2838361 A1 | 10/2003 |
| JP | 8039325 A | 2/1996 |

OTHER PUBLICATIONS

Korean Intellectual Property Office Notice of Grounds of Rejection (Dec. 10, 2012) for corresponding Korean App. 20087013754 (translation).

(Continued)

Primary Examiner — Omar Flores Sanchez
(74) Attorney, Agent, or Firm — WRB-IP LLP (57) ABSTRACT A tool for chip removing machining includes a tool holder in order to releasably hold at least one cutting insert. The cutting insert is arranged to be fixable in an insert pocket of the tool holder by a locking screw. The locking screw has a head and is in threaded engagement with the tool holder via a threaded joint which is arranged to allow tilting of the locking screw in a working direction of the tool when the locking screw is partly unscrewed so that the cutting insert can be removed from the insert pocket. The head is arranged to clamp against a part of a front side of the cutting insert. The tool holder includes at least one space at least partly arranged to receive the head when the screw is partly unscrewed.

12 Claims, 13 Drawing Sheets

(56) References Cited

U.S. PATENT DOCUMENTS

| | | | |
|---|---|---|---|
| 7,014,393 B2 * | 3/2006 | Matheis | 407/37 |
| 7,144,205 B2 * | 12/2006 | Sheffler et al. | 407/103 |
| 7,578,640 B2 * | 8/2009 | Hecht | 407/103 |
| 7,597,509 B2 * | 10/2009 | Sheffler et al. | 407/103 |
| 2007/0245535 A1 * | 10/2007 | Noggle | 29/428 |
| 2009/0290943 A1 * | 11/2009 | Noggle | 407/40 |

OTHER PUBLICATIONS

Korean Patent Laid Open KR10-1999-0072603 (Sep. 27, 1999) (corresponds to U.S. Patent No. 6,254,316)

* cited by examiner

TOOL

BACKGROUND AND SUMMARY

The present invention relates to a tool for chip removing machining.

This invention relates to tools having tool holders in order to releasably hold cutting inserts for chip removing machining of foremost metallic materials. It is particularly aimed at tools having tool holders that utilize tiltable locking screws in order to quickly fix, above all, indexable cutting inserts in tool holders.

A known device for clamping cutting inserts utilizes a conical hole in the tool holder, the axis of which is displaced in relation to the threaded section of the hole in the tool holder that accepts the locking screw so as to tilt the locking screw into abutment against the cutting insert. Said known devices make great demands on manufacturing tolerances in order to bring about the desired tilting of the locking screw.

It is desirable to provide a tool that can hold many cutting inserts.

It is also desirable to provide a tool wherein a plurality of cutting inserts can be arranged close to each other.

BRIEF DESCRIPTION OF THE DRAWINGS

Below, with a non-limiting purpose, preferred embodiments will be described, reference being made to the drawings wherein the same reference numerals relate to the same parts.

DETAILED DESCRIPTION OF PREFERRED EMBODIMENTS OF THE INVENTION

In FIGS. 1A-1D, a milling-cutter tool 10 according to the present invention is shown. The milling-cutter tool 10 comprises a milling-cutter body or tool holder 11. The tool holder 11 comprises a plurality of recesses 12 in order to releasably hold at least one cutting insert 13. The cutting insert 13 is arranged to be quickly fixable in an insert pocket by means of a locking screw 14 without entirely loosen the locking screw, i.e. the threads of a thread joint are still in engagement with each other. The locking screw 14 may form an angle with the rotational axis CL of the milling-cutter tool, of 20° to 80°. A hole 17, having an inner threaded end 17B, is arranged in the recess. The locking screw 14 has a head 15 in one end thereof and a thread 16 in the other end thereof, which other end is in threaded engagement with the threaded end 17B in the tool holder 11. The head 15 is arranged substantially symmetrically around the centre axis of the locking screw and provided with an outwardly terminating key grip ISA. All cross sections C-C in FIGS. 1A-5D are taken in a plane that coincides with the centre axis of the locking screw. The periphery of the head 15 comprises a clamping surface 15B or a first, preferably convex, outer part and a reaction surface 15C or a second, preferably conical, interior part. The threads 16, 17B are arranged in such a way that they allow tilting of the locking screw in a working direction R of the tool when the cutting insert is released, so that the cutting insert can be removed from the insert pocket. The tilting of the threads 16, 17B in relation to each other may be enabled in a known way by the diameters having sufficiently different dimensions. The tilting may be selected so that the angular difference between the centre axis of the unscrewed screw, with retained thread engagement with the thread 16, is 5-15° in relation to the centre axis of the tightened screw.

Figure 1A:
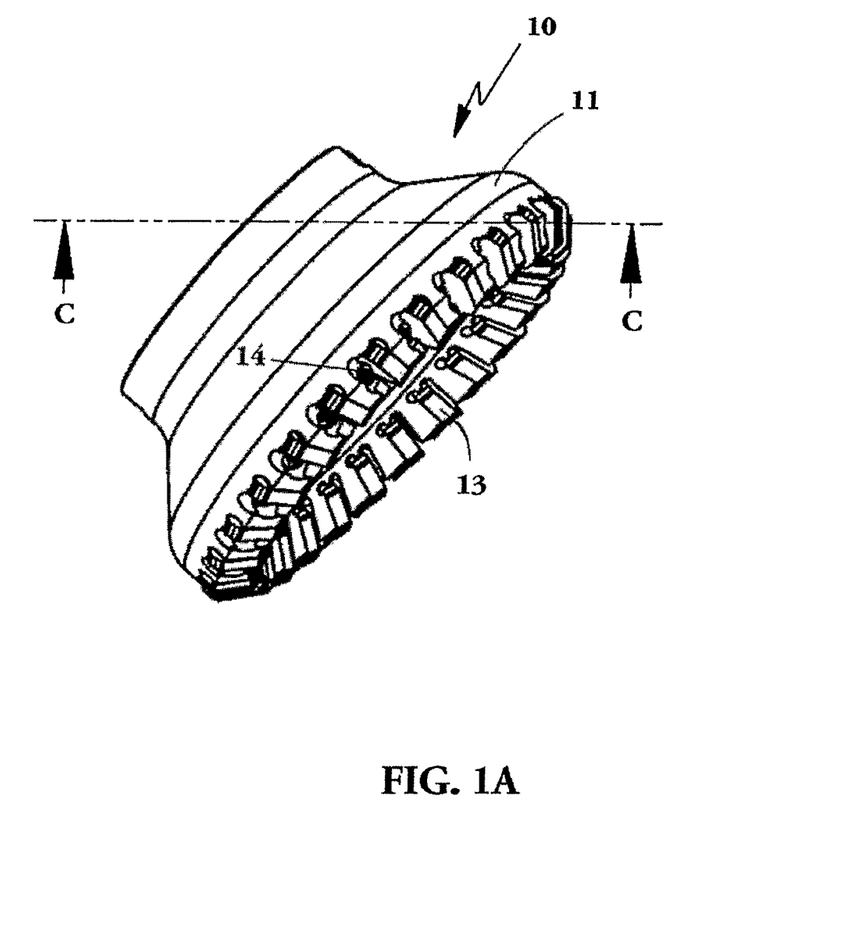
FIG. 1A shows a densely toothed milling-cutter tool according to the present invention in perspective view.
Figure 1B:
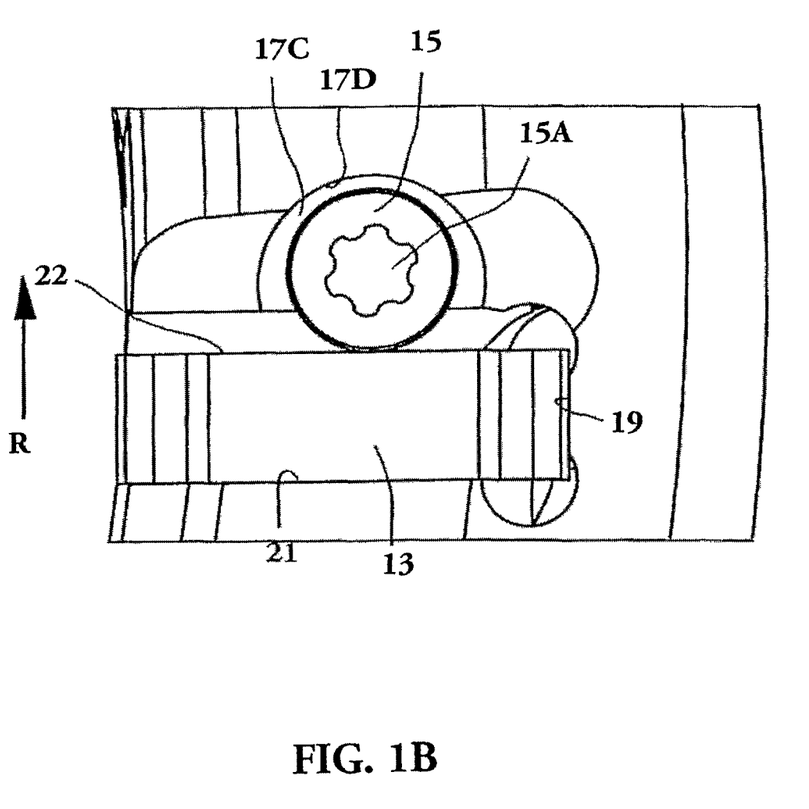
FIG. 1B shows a part of the milling-cutter tool in FIG. 1A enlarged.
Figure 1C:
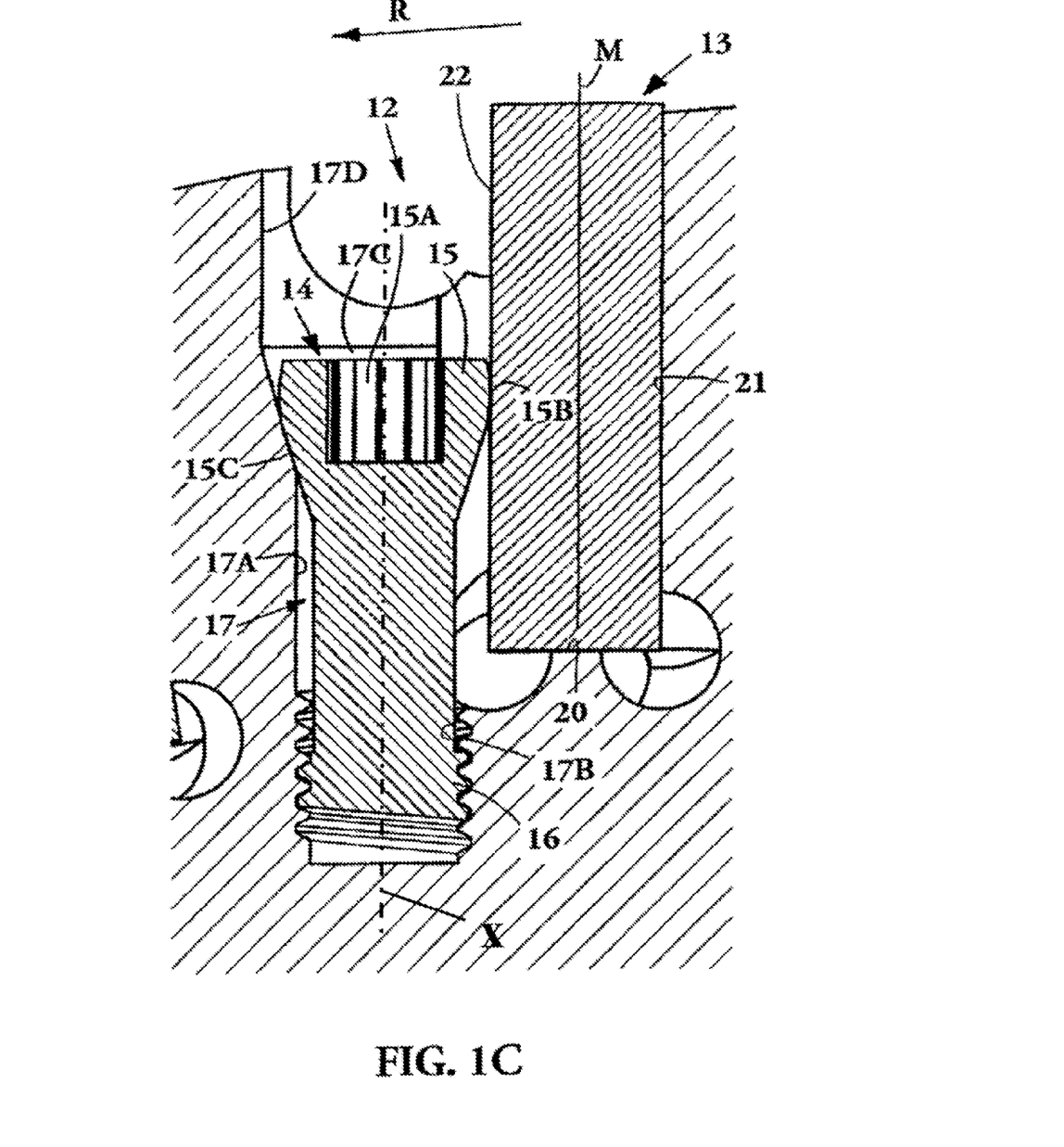
FIG. 1C shows a cross section according to line C-C in FIG. 1A.
Figure 1D:
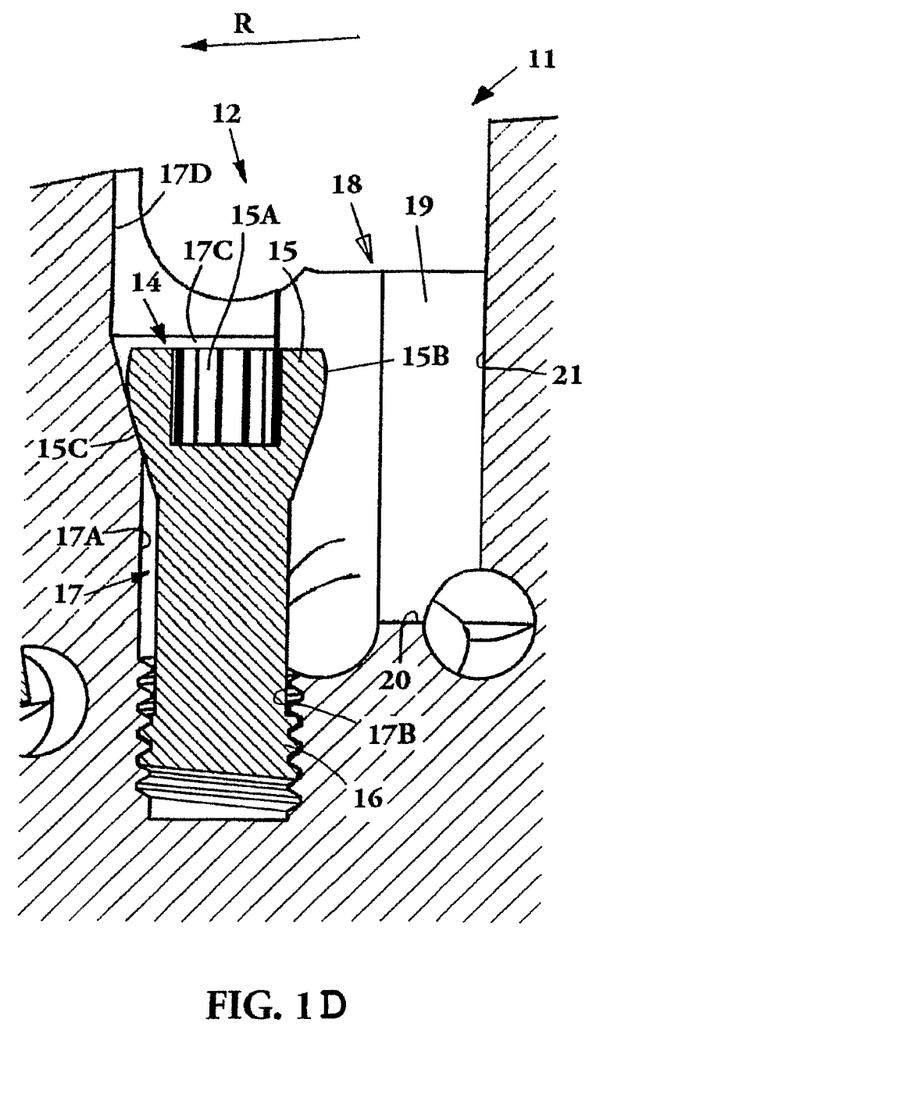
FIG. 1D shows a cross section according to FIG. 1C, however without cutting inserts.
Figure 1E:
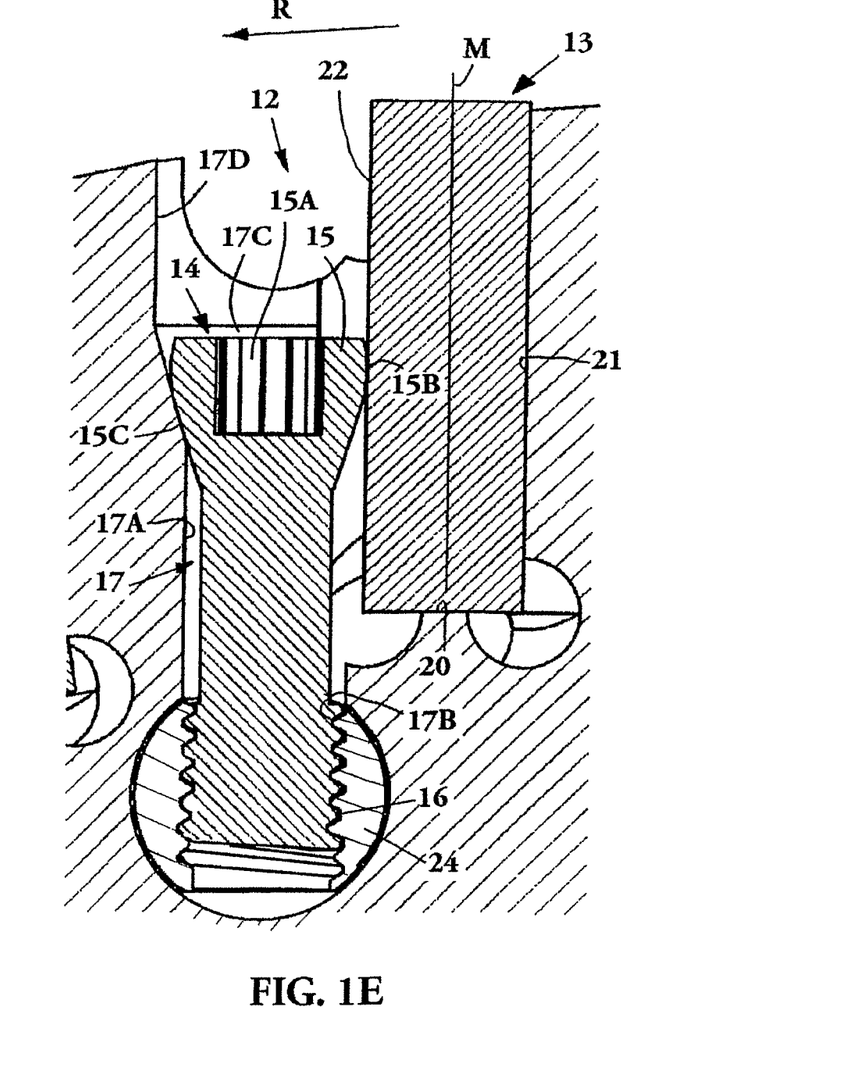
FIG. 1E shows an alternative embodiment in respect of the fixation of a locking screw.

Alternatively, tilting may be enabled, as in FIG. 1E, by arranging the threaded end 17B in a cylindrical stud 24 loosely arranged in a corresponding recess in the tool holder. Thereby, the locking screw can tilt principally around the stud upon tightening of the locking screw. Such a solution may be formed in all succeeding embodiments. It will be clear that some one of the clamping surface and the reaction surface abuts against a surface that is parallel with the centre line of the cutting insert, while the other one abuts against a surface that forms an angle with the centre line of the cutting insert. It is also seen that the head of the locking screw comprises a key grip, which, as seen in the working direction, is arranged in front of the front side of the cutting insert. It should be noted that in no one of the proposed embodiments does the locking screw run through the cutting insert. There are further possibilities of accomplishing tilting of the locking screw, for example by providing a barrel-shaped thread on the end 17B while the female thread 16 comprises an adapted cylindrical thread.

Each recess 12 in the tool holder 11 comprises an insert pocket 18, which in a known way comprises a radial support surface 19, an axial support surface 20 and a tangential support surface 21, against which the corresponding surfaces of the cutting insert 13 are arranged to abut. The hole 17 is arranged substantially centrally in the recess 12, in front of the insert pocket as seen in the working direction R of the tool. The hole 17 comprises a non-threaded, radial outer part 17A.

The radially outer part 17A of the hole 17 is open toward the cutting insert in order to allow protrusion of the screw head 15 toward the cutting insert or the insert pocket. The radially outer part 17A connects outward with a surface 17C, sloping in relation to a centre line M of the cutting insert, or a tapering part, the imaginary cone tip of which surface or part, not shown, is directed toward the threaded end 17B, so that the dimension of the hole 17 is widened. The tool holder comprises at least one space 17D at least partly arranged to receive the head 15 when the locking screw is partly unscrewed. The space 17D or a part-cylindrical hole part may be arranged outside the sloping surface 17C. The space 17D is intended to receive the head 15 when the locking screw 14 is sufficiently unscrewed, i.e., when the threads 16, 17 still are in engagement with each other. Alternatively, the space 17D may be replaced by other hole shapes or entirely be lacking so that the head 15 protrudes outside the periphery of the tool holder 11 in such an unscrewed position.

The cutting insert may have a negative basic shape, such as is shown in FIGS. 1A-1C, a positive basic shape or another basic shape. In FIG. 1C, the clamping side or front side, as seen in the working direction, of the cutting insert is designated 22. In this case, the centre line M of the cutting insert is substantially parallel with a plane that coincides with the support surface 21. The hole 17 has a centre line H and the locking screw has a centre axis X, both of which being substantially parallel with the centre line M in a tightened position.

The milling-cutter tool 10 may be assembled in the following way. The locking screw 14 is inserted into the recess 12 so that the threaded end 16 thereof comes into co-operation with the inner end 17B. By rotation of the locking screw 14, the locking screw will be pulled into the recess 12, in such a way that the head 15 is arranged in the space 17D, preferably without the head abutting against the sloping surface 17C. After that, the cutting insert 13 is inserted into the insert pocket 18 so that three of the surfaces thereof come into abutment against the surfaces 19-21. Thereby, most often a distance is present between the head and the cutting insert. By tightening the locking screw 14 via a key co-operating with the key grip 15A, the reaction surface 15C comes into (preferably line) contact with the sloping surface 17C. Thereby, the locking screw 14 is forced to tilt more and more against the cutting insert 13 until the clamping surface 15B abuts against the front side of the cutting insert 22, preferably by means of point contact. By defining the direction of the threads (left- or right-hand threads) as well as the general direction of the hole 17, the cutting insert can be pressed against all three support surfaces 19-21, and particularly against the support surface 19 in the tool holder. In order to loosen the cutting insert, for instance for indexing, said process is reversed. By the fact that the locking screw 14 acts directly against the cutting insert 13, a great number of cutting inserts can be arranged close to each other in the tool holder 11. Furthermore, the locking screw preferably acts centrally on the cutting insert.

Figure 2A:
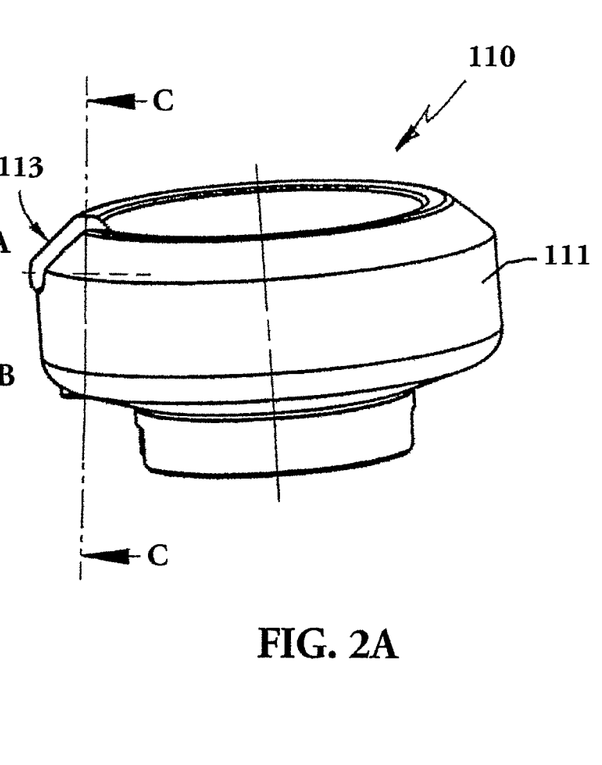
FIG. 2A shows an alternative embodiment of a milling-cutter tool according to the present invention in perspective view.
Figure 2B:
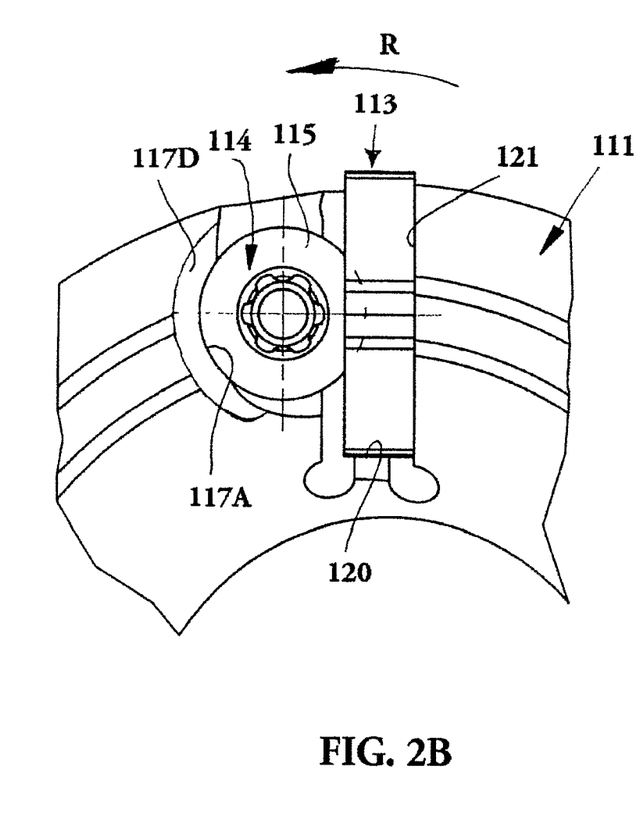
FIG. 2B shows a part of the milling-cutter tool in FIG. 2A enlarged.
Figure 2C:
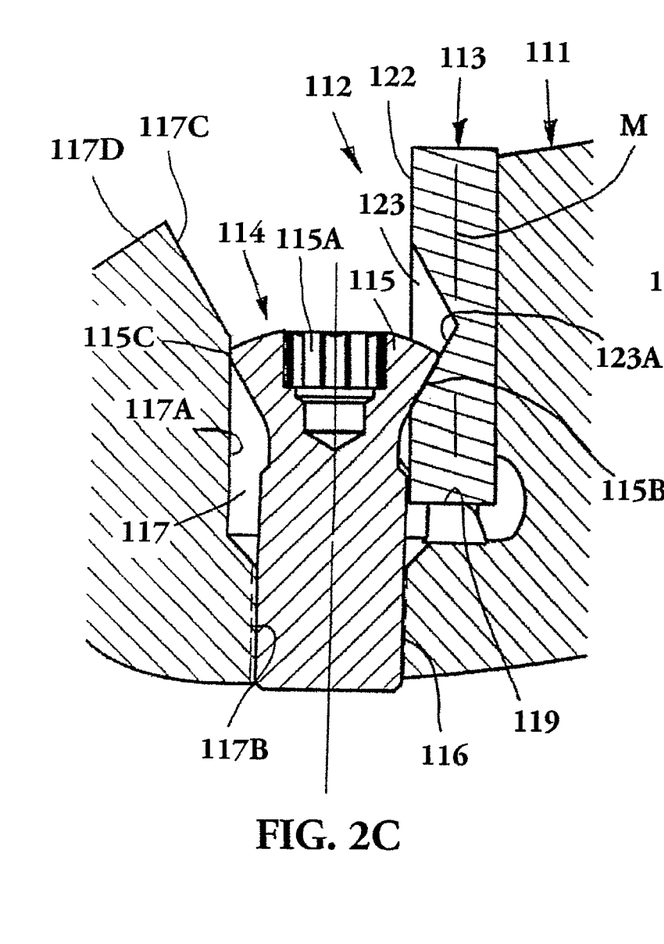
FIG. 2C shows a cross section according to line C-C in FIG. 2A.

In FIGS. 2A, 2B and 2C, an alternative embodiment of a milling-cutter tool 110 according to the present invention is shown. Only one cutting insert 113 of a plurality of cutting inserts is shown in FIG. 2A for the sake of clarity. This embodiment differs from the previously described embodiment according to FIGS. 1A-1C above all in that the head 115 of the locking screw 114 engages a concave recess 123 in the cutting insert 113 upon tightening of the locking screw into the threaded end 117B in the tool holder 111. The recess may have different shapes. The recess 123 of the cutting insert according to FIG. 2C has a general V-shape, the inner branch 123A of which in FIG. 2C slopes in relation to the centre axis of the locking screw that corresponds to the slope of the clamping surface 115B of the head 115. In this way, the function of the sloping surface 17C (see FIG. 1C) has, in this embodiment, been transferred to the cutting insert 113. Furthermore, in this embodiment, the locking screw is arranged generally closer to the cutting insert 113 than in the previously described embodiment.

The milling-cutter tool 110 may be assembled in the following way. The locking screw 114 is inserted into the recess 112 so that the threaded end 116 thereof comes into co-operation with the inner end 117B. By rotation of the locking screw 114, the locking screw will be pulled into the recess 112, in such a way that the head 115 is arranged partly in the space 117D. After that, the cutting insert 113 is inserted into the insert pocket 118 so that three of the surfaces thereof come into abutment against the surfaces 119-121. Thereby, a distance is present between the head and the cutting insert. By tightening the locking screw 114 via a key co-operating with the key grip 115A, the clamping surface 115B comes into (preferably line) contact with the space 117D. Thereby, the locking screw 114 is forced to tilt more and more against the cutting insert 113 until the reaction surface 115C reaches a non-threaded part 117A of the hole. Upon additional tightening of the locking screw, the locking screw is principally not tilted, but the clamping surface 115B abuts against the branch 123A in the recess 123 of the front side of the cutting insert 122, for example by means of line contact. Thereby, the cutting insert will be clamped in the insert pocket. The centre axis of the locking screw is substantially parallel with the centre line of the cutting insert in said last-mentioned position. By defining the direction of the threads (left- or right-hand threads) as well as the general direction of the hole 117, the cutting insert can be pressed against all three support surfaces 119-121, and particularly against the Support surface 119 in the tool holder. In order to loosen the cutting insert, for instance for indexing, said process is reversed. By the fact that the locking screw 114 acts directly against the cutting insert 113, a great number of cutting inserts can be arranged close to each other in the tool holder 111.

Figure 3A:
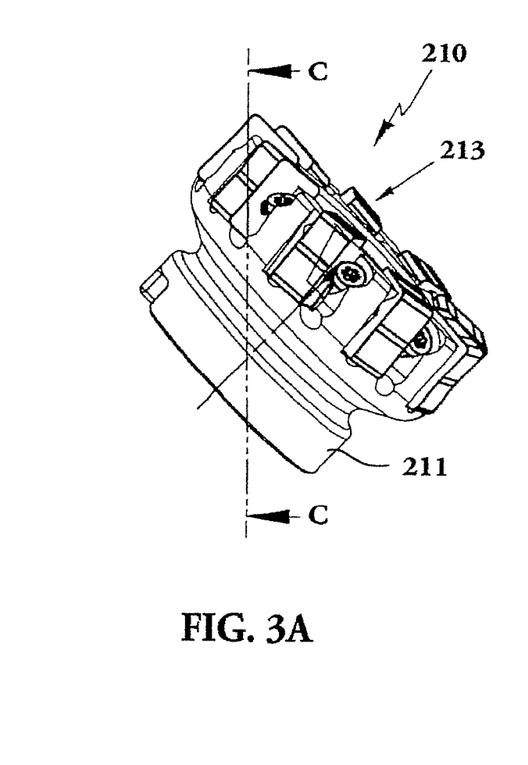
FIG. 3A shows yet an alternative embodiment of a milling-cutter tool according to the present invention in perspective view.
Figure 3B:
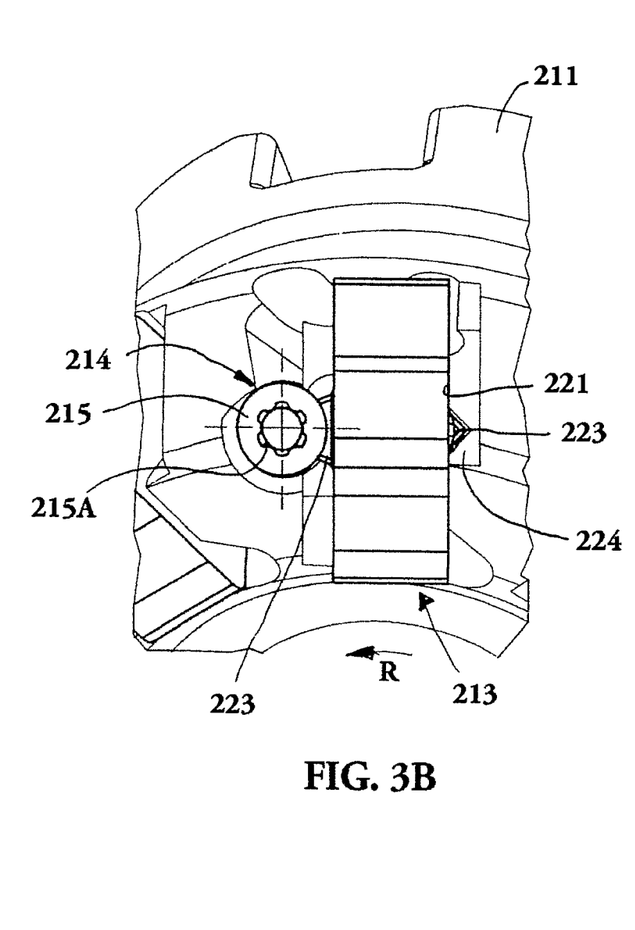
FIG. 3B shows a part of the milling-cutter tool in FIG. 3A enlarged.
Figure 3C:
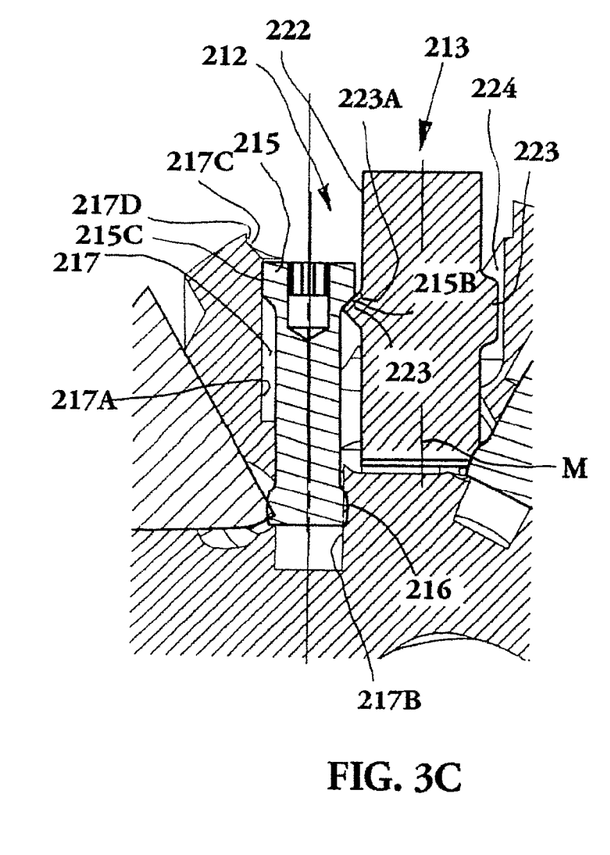
FIG. 3C shows a cross section according to line C-C in FIG. 3A.

In FIGS. 3A, 3B and 3C, yet an alternative embodiment of a milling-cutter tool 210 according to the present invention is shown. This embodiment differs from the previously described embodiment according to FIGS. 2A-2C above all in that the head 215 of the locking screw 214 engages a convex projection 223 of the cutting insert 213 upon tightening of the locking screw into the threaded end 217B in the tool holder 211. The projection may have different shapes and may be centrally placed on the cutting insert. The projection 223 of the cutting insert according to FIG. 3C has a general roof shape, the radially outer sloping surface 223A of which in FIG. 3C slopes in relation to the centre axis of the locking screw in correspondence with the slope of the clamping surface 215B of the head 215. Preferably, yet another projection 223 is arranged on the tangential support surface of the cutting insert, i.e., opposite the front side 222, the second projection being arranged substantially perpendicularly to the first-mentioned projection in order to be able to utilize unworn cutting edges. The tangential support surface 221 of the insert pocket is provided with a recess in order to receive the passive projection. The clamping surface 215B of the head 215 forms a truncated cone, the imaginary cone tip of which, not shown, is directed toward the threaded end 217B. In this way, the function of the sloping surface 17C (see FIG. 1C) has, in this embodiment, been transferred to the cutting insert 213.

The milling-cutter tool 210 may be assembled in the following way. The locking screw 214 is inserted into the recess 212 so that the threaded end 216 thereof comes into co-operation with the inner end 217B. By rotation of the locking screw 214, the locking screw will be pulled into the recess 212, in such a way that the head 215 is arranged partly in the space 217D. After that, the cutting insert 213 is inserted into the insert pocket 218 in such a way that three of the surfaces thereof come into abutment against the support surfaces in the insert pocket. Thereby, a distance is present between the head and the cutting insert. By tightening the locking screw 214 via a key co-operating with the key grip 215A, the clamping surface 215B comes into (preferably line) contact with the sloping surface 217C. Thereby, the locking screw 214 is forced to tilt more and more against the cutting insert 213 until the reaction surface 215C reaches a non-threaded part 217A of the hole 217. Upon additional tightening of the locking screw, the locking screw is principally not tilted, but the clamping surface 215B abuts against the outer sloping surface 223A of the projection 223 on the front side of the cutting insert 222, for example by means of line contact. Thereby, the cutting insert will be clamped in the insert pocket. The centre axis of the locking screw is substantially parallel with the centre line of the cutting insert in said last-mentioned position. By defining the direction of the threads (left- or right-hand threads) as well as the general direction of the hole 217, the cutting insert can be pressed against all three support surfaces 219-221, and particularly against the support surface 219 in the tool holder. In order to loosen the cutting insert, for instance for indexing, said process is reversed, wherein a new outer sloping surface of the projection 223 will come to use. By the fact that the locking screw 214 acts directly against the cutting insert 213, a great number of cutting inserts can be arranged close to each other in the tool holder 211.

Figure 4A:
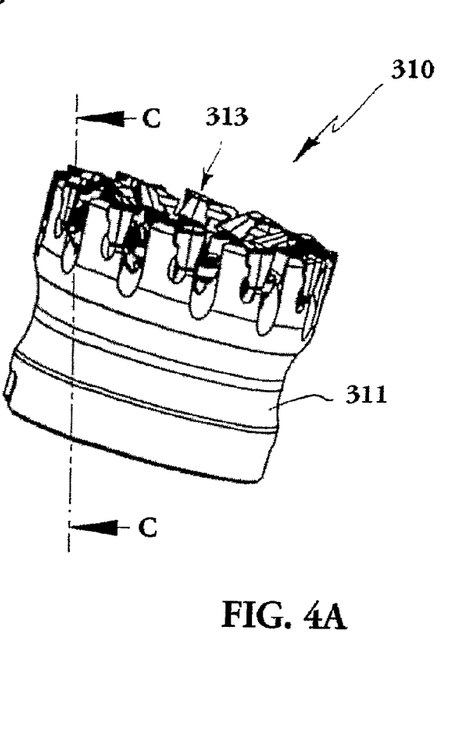
FIG. 4A shows an additional alternative embodiment of a milling-cutter tool according to the present invention in perspective view.
Figure 4B:
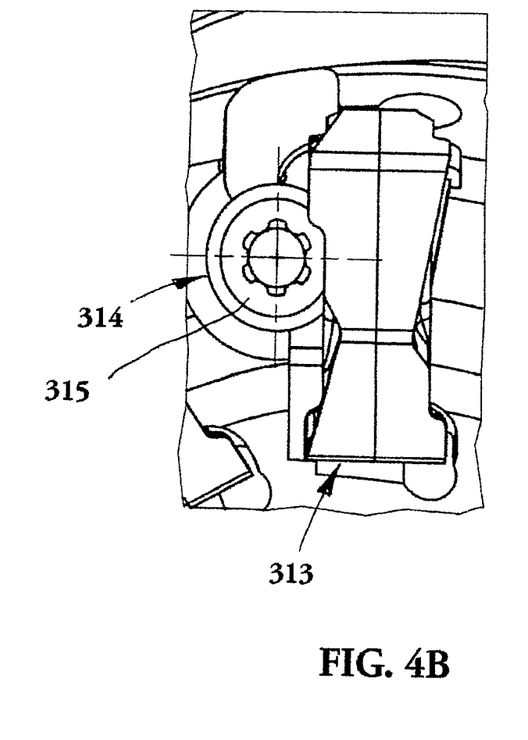
FIG. 4B shows a part of the milling-cutter tool in FIG. 4A enlarged.
Figure 4C:
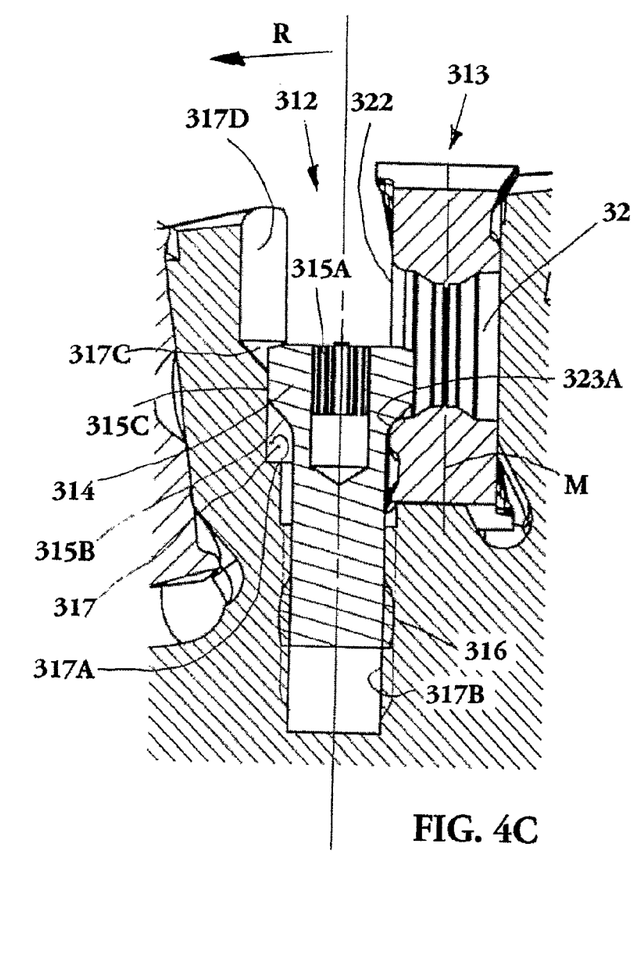
FIG. 4C shows a cross section according to line C-C in FIG. 4A.

In FIGS. 4A, 4B and 4C, an additional alternative embodiment of a milling-cutter tool 310 according to the present invention is shown. This embodiment differs from the previously described embodiment according to FIGS. 3A-3C above all in that the cutting insert 313 has been provided with a through-going hole 323 in order to increase the indexing possibilities, as is seen from FIG. 4C. In this embodiment, the head 315 abuts against a verge of the hole 323 by a clamping surface 315B.

The milling-cutter tool 310 may be assembled in the following way. The locking screw 314 is inserted into the recess 312 so that the threaded end 316 thereof comes into co-operation with the inner end 317B. By rotation of the locking screw 314, the locking screw will be pulled into the recess 312, so that the head 315 is arranged partly in the space 317D. After that, the cutting insert 313 is inserted into the insert pocket 318 in such a way that three of the surfaces thereof come into abutment against the support surfaces in the insert pocket. Thereby, a distance is present between the head and the cutting insert. By tightening the locking screw 314 via a key co-operating with the key grip 315A, the clamping surface 315B comes into (preferably point) contact with the sloping surface 317C. Thereby, the locking screw 314 is forced to tilt more and more against the cutting insert 313 until the reaction surface 315C reaches a non-threaded part 317A of the hole. Upon additional tightening of the locking screw, the locking screw is principally not tilted any more, but the clamping surface 315B abuts against the verge 323A of the hole 323 on the front side of the cutting insert 322, for example by means of point contact. Thereby, the cutting insert will be clamped in the insert pocket. The centre axis of the locking screw is substantially parallel with the centre line of the cutting insert in said last-mentioned position. By defining the direction of the threads (left- or right-hand threads) as well as the general direction of the hole 317, the cutting insert can be pressed against all three support surfaces 319-321, and particularly against the support surface 319 in the tool holder. In order to loosen the cutting insert, for instance for indexing, said process is reversed. By the fact that the locking screw 314 acts directly against the cutting insert 313, a great number of cutting inserts can be arranged close to each other in the tool holder 311.

Figure 5A:
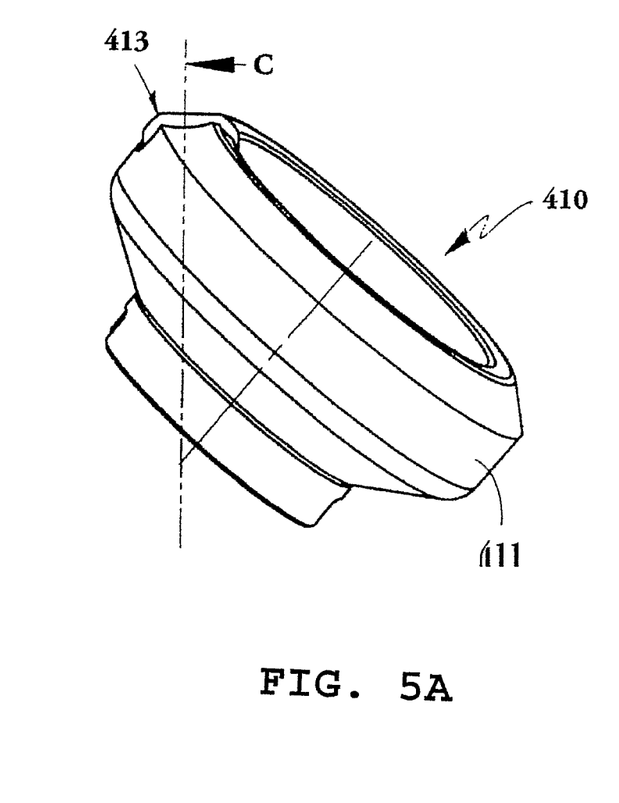
FIG. 5A shows yet an alternative embodiment of a milling-cutter tool according to the present invention in perspective view.
Figure 5B:
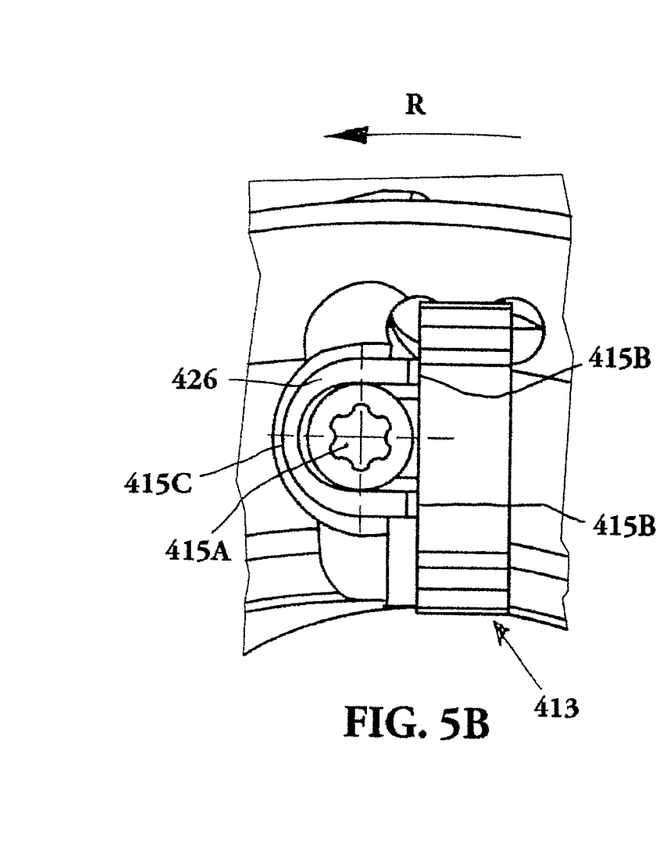
FIG. 5B shows a part of the milling-cutter tool in FIG. 5A enlarged.
Figure 5C:
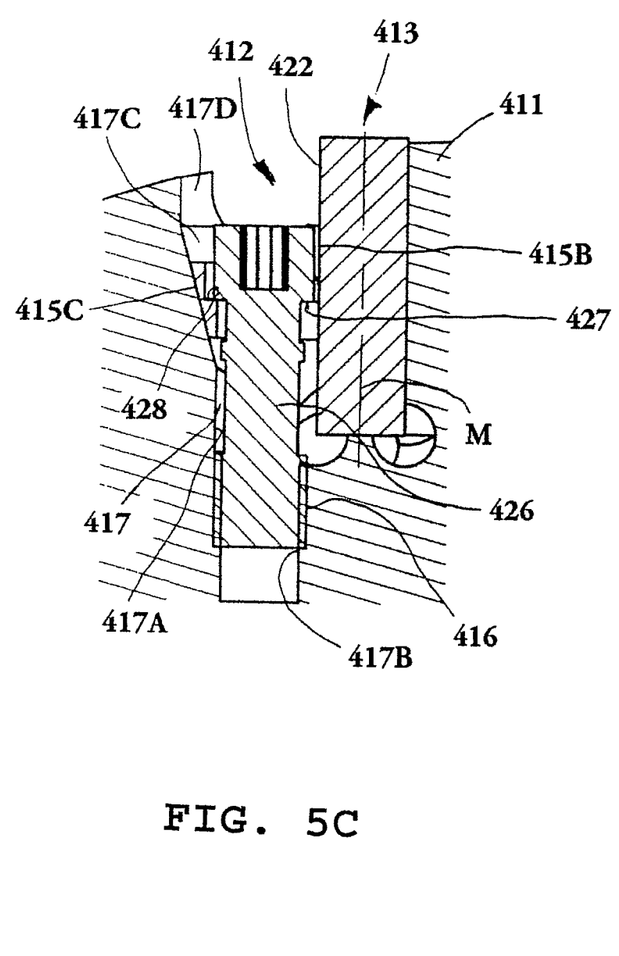
FIG. 5C shows a cross section according to line C-C in FIG. 5A.
Figure 5D:
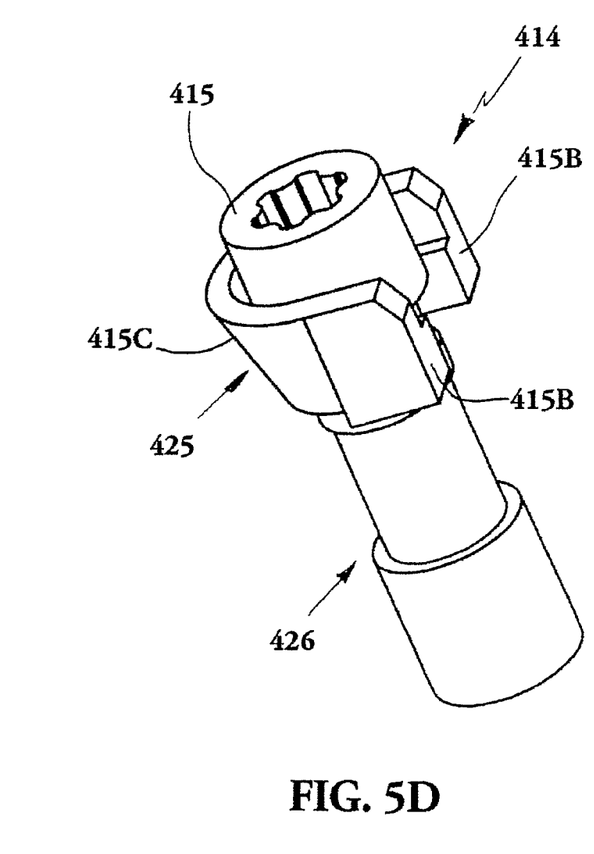
FIG. 5D shows an enlargement of a locking screw used in the milling-cutter tool according to FIG. 5A.

In FIGS. 5A, 5B and 5C, an alternative embodiment of a milling-cutter tool 110 according to the present invention is shown. Furthermore, a locking screw 414 is shown enlarged in FIG. 5D. Only one cutting insert 113 of a plurality of cutting inserts is shown in FIG. 5A for the sake of clarity. This embodiment differs from the previously described embodiment according to FIGS. 1A-1C above all in that the locking screw 414 consists of or comprises two separate parts, i.e., a movable head or a wedge 425 and a screw 426. The wedge 425 is substantially U-shaped, the ends or clamping surfaces 415B thereof facing the cutting insert 413 being substantially planar, while the part thereof facing from the cutting insert being a tapering part 415C that forms an angle with the centre axis of the screw, not shown. The wedge is tapering toward the interior threaded end 417B. The screw 426 comprises a head 415 provided with a first abutment surface 427, which is substantially perpendicular to the centre axis of the screw. The wedge comprises a second abutment surface 428, which is substantially perpendicular to the centre axis of the screw. Preferably, the wedge is kept the around the screw by co-operating grooves and projections, so that these can be handled as one unit.

The milling-cutter tool 410 may be assembled in the following way. The locking screw 414, i.e., the wedge 425 and the screw 426, is inserted into the recess 412 so that the threaded end 416 of the screw comes into co-operation with the inner end 417B. By rotation of the screw 426 via the key grip 415A, the locking screw 414 will be pulled into the recess 412, in such a way that the wedge 425 is arranged partly in the space 417D. After that, the cutting insert 413 is inserted into the insert pocket in such a way that three of the surfaces thereof come into abutment against the support surfaces in the insert pocket. Thereby, a distance between the wedge and the cutting insert is most often present. By tightening the screw 425 via a key co-operating with the key grip, the reaction surface 415C comes into (preferably line) contact with the sloping surface 417C of the hole 417. Thereby, the locking screw 414 is forced to tilt more and more against the cutting insert 413 until the ends 415B reach the front side of the cutting insert 422. Upon additional tightening of the screw, the wedge is forced down by means of the abutment surfaces 427 and 428 between the cutting insert and the sloping surface 417C. Thereby, the cutting insert will be clamped in the insert pocket. The centre axis of the locking screw is substantially parallel with the centre line of the cutting insert in said last-mentioned position. The cutting insert is pressed against all three support surfaces 419-321 in the tool holder. In order to loosen the cutting insert, for instance for indexing, said process is reversed. Also this embodiment allows close spacing between the cutting inserts in the tool holder, since the wedge is made insignificantly greater than the heads 15, 115, 215 of the previously described locking screws. By the fact that the locking screw 414 acts directly against the cutting insert 413, a great number of cutting inserts can be arranged close to each other in the tool holder 411.

Thus, the present invention relates to a tool that can hold many cutting inserts and wherein a plurality of cutting inserts can be arranged close to each other. As is seen above, different devices are provided for quick loosening as well as assembly of cutting inserts for chip removing machining.

Modifications may be carried out within the scope of the appended claims. For example, the different embodiments may be combined in various ways, such as, for instance, that cutting inserts having recesses are arranged where only cutting inserts without recesses have been shown, FIGS. 1C and 5C, or vice versa.

The disclosures in Swedish patent application No. 0502678-6, from which this application claims priority, are incorporated herein by reference.

| Features | FIGS. 1A-1E | FIGS. 2A-2C | FIGS. 3A-3C | FIGS. 4A-4C | FIGS. 5A-5D |
|---|---|---|---|---|---|
| Tool | 10 | 110 | 210 | 310 | 410 |
| Tool holder | 11 | 111 | 211 | 311 | 411 |
| Recess | 12 | 112 | 212 | 312 | 412 |
| Cutting insert | 13 | 113 | 213 | 313 | 413 |
| Locking screw | 14 | 114 | 214 | 314 | 414 |
| Head | 15 | 115 | 215 | 315 | 415 |
| Key grip | 15A | 115A | 215A | 315A | 415A |
| Clamping surface | 15B | 115B | 215B | 315B | 415B |
| Reaction surface | 15C | 115C | 215C | 315C | 415C |
| Thread | 16 | 116 | 216 | 316 | 416 |
| Hole | 17 | 117 | 217 | 317 | 417 |
| Non-threaded part | 17A | 117A | 217A | 317A | 417A |
| Threaded end | 17B | 117B | 217B | 317B | 417B |
| Sloping surface | 17C | 117C | 217C | 317C | 417C |
| Space | 17D | 117D | 217D | 317D | 417D |
| Insert pocket | 18 | —* | — | — | — |
| Radial support surface | 19 | 119 | — | — | — |
| Axial support surface | 20 | 120 | — | — | — |
| Tangential support surface | 21 | 121 | 221 | — | — |
| Front side | 22 | 122 | 222 | 322 | 422 |
| Projection, recess or hole | — | 123 | 223 | 323 | — |
| Outer sloping surface | — | — | 223A | — | — |
| Stud | 24 | — | — | — | — |
| Wedge | — | — | — | — | 425 |
| Screw | — | — | — | — | 426 |
| First abutment surface | — | — | — | — | 427 |
| Second abutment surface | — | — | — | — | 428 |

*by "—" is meant: not relevant or not necessary to show

The invention claimed is:

1. A tool for chip removing machining comprising a tool holder in order to releasably hold at least one cutting insert, the cutting insert being arranged to be fixable in an insert pocket of the tool holder by means of a locking screw, the locking screw having a head and being in threaded engagement with the tool holder via a threaded joint, wherein the threaded joint is arranged to allow tilting of the locking screw in a working direction of the tool when the locking screw is partly unscrewed but the threads are still in engagement with each other, so that the cutting insert can be removed from the insert pocket, and the head is arranged to clamp against a part of a front side, as seen in the working direction, of the cutting insert, and the tool holder comprises at least one space at least partly arranged to receive the head when the screw is partly unscrewed.

2. The tool according to claim 1, wherein the locking screw is arranged to co-operate with a hole in a recess of the tool holder, the hole having a centre line that is substantially parallel with a centre line of the cutting insert.

3. The tool according to claim 2, wherein the locking screw has a centre axis, which is substantially parallel with a centre line of the cutting insert in a tightened position.

4. A tool for chip removing machining comprising a tool holder in order to releasably hold at least one cutting insert, the cutting insert being arranged to be fixable in an insert pocket of the tool holder by means of a locking screw, the locking screw having a head and being in threaded engagement with the tool holder via a threaded joint, wherein the threaded joint is arranged to allow tilting of the locking screw in a working direction of the tool when the locking screw is partly unscrewed but the threads are still in engagement with each other, so that the cutting insert can be removed from the insert pocket, and the head is arranged to clamp against a part of a front side, as seen in the working direction, of the cutting insert, and the tool holder comprises at least one space at least partly arranged to receive the head when the screw is partly unscrewed, wherein the locking screw is arranged to co-operate with a hole in a recess of the tool holder, the hole having a centre line that is substantially parallel with a centre line of the cutting insert, and wherein the hole in the recess of the tool holder comprises a surface sloping in relation to a centre line of the cutting insert, which surface widens the dimension of the hole, and the head is intended to abut against said sloping surface during screwing-in of the locking screw.

5. The tool according to claim 4, wherein a periphery of the head comprises a clamping surface and a reaction surface and the clamping surface is arranged to abut against the cutting insert while the reaction surface is arranged to abut against a part of the hole when the locking screw is tightened.

6. The tool according to claim 5, wherein one of the clamping surface and the reaction surface abuts against a surface that is parallel with the centre line of the cutting insert, and the other one abuts against a surface that forms an angle with the centre line of the cutting insert.

7. The tool according to claim 1, wherein the cutting insert comprises a projection, a recess or a verge of the hole against which the head is arranged to abut when the locking screw is tightened.

8. The tool according to claim 1, wherein the head of the locking screw comprises a key grip, which, as seen in the working direction, is arranged in front of the front side of the cutting insert.

9. The tool according to claim 1, wherein diameters of the threads have sufficiently different dimensions in order to enable tilting in relation to each other.

10. The tool according to claim 1, wherein the threaded end of the locking screw co-operates with a thread of a cylindrical stud loosely arranged in a corresponding recess in the tool holder.

11. The tool according to claim 1, wherein the head of the locking screw clamps the cutting insert by being wedged between the cutting insert and a surface of the toolholder.

12. The tool according to claim 1, wherein diameters of the threads of the threaded joint are sufficiently different to allow the tilting of the locking screw in the working direction of the tool when the locking screw is partly unscrewed but the threads are still in engagement with each other.

* * * * *